Patented Aug. 24, 1937

2,090,797

UNITED STATES PATENT OFFICE 2,090,797

METHOD OF PRODUCING SULPHUR THROUGH REDUCTION OF GASES CONTAINING SULPHUR DIOXIDE

Axel Rudolf Lindblad, Djursholm, Sweden

No Drawing. Application June 20, 1935, Serial No. 27,540. In Sweden February 22, 1935

2 Claims. (Cl. 23—226)

The present invention relates to an improved method of producing sulphur from gases containing sulphurous anhydride and obtained by roasting or other oxidizing treatment of sulphurous pyrites, arsenic pyrites or other sulphur containing material by reduction of the sulphur dioxide with generator gas (producer gas).

The essence of the invention resides in the fact that the gases containing sulphurous anhydride and a suitable quantity of oxygen, are fed into a gas generator the charge of which consists of a carbonaceous material admixed or impregnated with a suitable quantity of alkali or alkali compound, whereupon the reducing gas mixture thus obtained is brought together with a regulated amount of sulphurous anhydride or a gas mixture containing sulphurous anhydride, and is conducted through a reaction chamber filled with a suitable material. As a result, the greater part of the supplied sulphur dioxide is reduced to elementary sulphur which is then separated in coolers and Cottrell apparatus and then collected.

It has been found that the introduction of alkali or alkaline compounds (compounds of alkaline metal) into the generator together with the solid reducing agent has an extraordinarily favorable effect upon the entire process. Indeed, one may say that the process is practically and economically rendered possible thanks to the use of these compounds. To wit: they act as excellent catalyzer upon the reduction processes included in the present method, and by introducing them at the above mentioned part of the system together with the carbonaceous material into the generator it is possible to profit by their favorable action in all the phases of the production up to the finished sulphur. This is due to the fact that alkali or the alkaline compounds are gasified already in the generator at the temperature prevailing in the same and then accompany, in the form of vapor or dust, the gas current through the system.

The carbonaceous material forming the charge of the gas generator may conveniently consist of coke, but other materials may also be used, for instance pit coal or charcoal, and, in some cases, it may be advantageous to feed the generator with a mixture of some of these reducing agents. The alkali or the alkaline compounds may consist of sodium compounds, which, from an economical point of view, are the cheapest, sodium carbonate, sodium sulphate or sodium sulphide having proved to be particularly adapted to the purpose in question. From a practical point of view, it is most expedient to mix or impregnate the carbonaceous material with the alkaline compound before loading the generator with said carbonaceous material, but it is, of course, also possible to introduce the carbonaceous material and the alkaline compound separately.

In introducing the gas mixture containing sulphurous anhydride and oxygen, into the generator, which gas mixture may have been obtained in the roasting of sulphurous pyrites, arsenic pyrites or other sulphur containing material, these two gases react with the carbonaceous material with formation of sulphur and reducing gases, such as CO, COS and $CS_2$, and besides, the slight quantity of water which, in the form of moisture, is always present in the charge, and the introduced gas mixture react together to form hydrogen sulphide. The alkaline compounds have, however, an extraordinary catalyzing effect upon these reactions, and the rapidity of reaction will be increased in a high degree through the presence of said compounds. This involves a reduction of the period of time during which the gas mixture has to be kept in contact with the carbonaceous material for obtaining a complete transformation, and this, in turn, permits the speed of flow of the gas in the generator to be increased, the capacity of the same being thereby improved to a substantial degree.

The temperature in the generator must be kept high, so that the conditions of equilibrium of those reactions which result in the formation of the above-mentioned reducing gases, are as favorable as possible, a temperature comprised between 700 and 1100° C. having proved to be the most suitable one. Since the heat liberated in the process originates exclusively from the reaction of the oxygen contained in the gas mixture with the carbonaceous material, said reaction resulting in the formation of carbon oxide, it is thus possible to set the temperature at a desired number of degrees by regulating the percentage of oxygen in the gas containing sulphurous anhydride, for instance by supplying a greater or smaller quantity of air. Another possibility of regulating the temperature consists in the preheating of the gas mixture prior to its introduction into the generator, and in this manner it is possible to attain a sufficient temperature with a lower percentage of oxygen and with a higher percentage of $SO_2$ in the entering gas, which will, of course, be favorable from an economical point of view. Frequently it will be convenient to preheat the entering gas containing sulphur dioxide, by means of gases leaving the system.

The gas generator employed may be of any construction, but the best result has been obtained when the generator has been equipped with revolving grate. Upon the reaction of the introduced gas mixture containing sulphur dioxide with the carbonaceous material, there will be formed on the surface of said material an obstructing ash layer which will considerably reduce the rapidity of reaction, it being understood that the gas molecules, in entering, have to diffuse through the ash layer before reaction can take place, and, in leaving, have to diffuse through it again. All this takes a great deal of time and, therefore, it is of great importance that the obstructing ash layer be removed. This is effected in the most suitable way by using a generator fitted with movable grate, for instance a so-called revolving grate. In this case, the charge will be in permanent motion, the pieces of coal thus rubbing against each other so that the ash layer as produced will be removed according as it is formed, and free carbon surfaces will always be presented to the gas mixture.

As the reducing gas mixture coming from the generator is brought together with a regulated amount of sulphurous anhydride or the gas mixture containing sulphurous anhydride, usually roasting furnace gas, a reaction takes place which results in the separation of elementary sulphur in the form of vapor, essentially carbonic acid then being formed. These reactions are catalyzed by the alkali or the alkaline compound which, for the reason stated above, accompanies the reducing gas mixture coming from the generator. However, in order to cause the reduction to take place fairly quantitatively and within a reasonable period of time, it is necessary to conduct the resulting gas mixture through a reaction chamber filled with a suitable material, for instance brick, bauxite containing iron, or with other materials, especially materials containing iron, said reaction chamber being maintained at a temperature from 500 to 800° C. In this chamber, the alkali or the alkaline compound contained in the gas mixture separates and so deposits on the brick, forming by reaction with silicic acid and other substances a catalytic coating which is highly active.

Due to the continuous supply of alkali or alkaline compound to the contact chamber there will, in this chamber, always exist free catalytically acting surfaces. One of the greatest disadvantages in connection with the use of a contact chamber filled with catalytic material has previously been that the surfaces of the contact substance will gradually be covered with soot, tar and dust, whereby the catalyzing effect decreases and ceases in course of time. By the use of alkali and alkaline compounds in the manner indicated above, this inconvenience is removed, and free contact surfaces acting catalytically are always presented to the gas mixture.

In order further to illustrate the principle of the present invention, there will be given an example which gives a good result of the manner in which the method may be carried out. This example should, however, only be regarded as an example of various embodiments of the invention which embodiments may be used in the application of the method in practice, and thus does not involve a limitation of the invention to this embodiment only.

The percentage of sulphur dioxide in those gases which are used in the present process, for instance roasting furnace gases, may be of any order of magnitude, but it is advantageous for them to contain, on their introduction into the gas generator, about 4 to 5% $SO_2$ and an amount of oxygen of about 11 percentage by volume $O_2$ (free i. e. not chemically combined oxygen). The roasting of sulphurous pyrites or other sulphur containing material may, of course, be carried on in such a manner that a gas having this composition will be obtained, it is true, but generally it will be more suitable, with a view to later phases of the manufacture, to try to produce a roasting furnace gas having as high a percentage of $SO_2$ as possible, for instance 9 to 10% $SO_2$ and an amount of oxygen of 4 to 5% $O_2$, whereupon this gas is diluted with a regulated amount of air, so that the resulting gas mixture will contain about 11% $O_2$. This gas, prior to its introduction into the gas generator, is conducted through a preheater in which it is heated from 100 to 300° C. by means of hot exhaust gases leaving the system. By supplying gas having this temperature and this percentage of oxygen to the gas generator there will be obtained in the generator, a temperature favorable to the process and amounting, in the present case, to about 1000° C.

The carbonaceous material forming the charge of the gas generator provided with revolving grate conveniently consists of coke in which has been incorporated about 1 percentage by weight of sodium carbonate. This amount of sodium carbonate has proved to be satisfactory to bring about a catalyzing effect that is quite sufficient for the process.

The hot gas mixture containing sulphurous anhydride and being rich in oxygen, after having been introduced into the generator, reacts, while being influenced by the soda catalyzing the reaction, with the reducing agent with formation of sulphur, carbon oxide, carbon oxysulphide, and carbon disulphide, the sodium carbonate being gasified to a larger or smaller extent and accompanying, in the form of vapor or dust, the reducing gases leaving the generator, on their way through the system.

The reducing gases escaping from the charge of the generator are, while being still hot, possibly in the upper part of the generator or immediately outside the same, brought together with a further amount of gas containing sulphur dioxide, said amount of gas being regulated according to circumstances. A roasting furnace gas having the composition indicated above, i.e. containing about 9 to 10% $SO_2$ and about 4 to 5% $O_2$ is particularly adapted to this purpose. As a result, a reaction takes place which is catalyzed by the sodium compound present, elementary sulphur then being formed. In order to cause the reaction to take place fairly quantitatively it is, however, necessary to conduct the gas mixture as produced to a contact chamber filled with a suitable material, preferably a material containing iron. Said material may consist of ordinary brick or, what is still more preferable, of bauxite, and the temperature in the contact chamber should amount to 500 to 700° C. The sodium compound which has accompanied the gas mixture, separates in said chamber and deposits on the surfaces of the contact material, while forming a catalytic coating which is extraordinarily active and, due to the continuous supply of sodium compound, will be incessantly renewed so that free surfaces acting catalytically are always presented to the gas mixture. In this contact chamber, the reaction between the reducing gases and the sulphur dioxide is carried on to an end, whereupon the sulphur formed is separated in coolers and Cottrell apparatus.

Thus, the alkali, for instance sodium carbonate, introduced into the gas generator is utilized in two different phases or moments during production, in the gas generator as well as in the catalyzer chamber, to which it is carried, as mentioned above, in gaseous state or in the form of powder or dust.

To summarize, it may be said that the inventor, by supplying alkali or alkaline compounds to the gas generator together with the charge of the same and by effecting the reduction process in the manner hereinbefore indicated, has succeeded in introducing, in a single procedure, an extraordinarily active catalyzer the action of which may be utilized throughout the system. Of course, the same amount of alkaline compound catalyzes, on the one hand, the reaction of the gas mixture containing sulphurous anhydride and oxygen with the carbonaceous material, and, on the other hand, the reduction of the supplied gas containing sulphur dioxide and usually consisting of roasting furnace gas, which reduction is effected by means of the reducing gases as formed. The action of the alkali and the alkaline compounds thus extends from the beginning of the process to the end thereof, and one can speak of a complete utilization of the same.

Having thus described my invention I declare that what I claim is:—

1. A method of producing elemental sulphur from sulphur dioxide-containing gas in which the sulphur dioxide is reduced to elemental sulphur which comprises, passing a gas containing sulphur dioxide and free oxygen into contact with carbonaceous matter in the presence of an alkali-metal compound in a reaction chamber, providing a sufficiently elevated temperature within the chamber to reduce the sulphur dioxide and vaporize at least a portion of the alkali-metal compound, combining the free oxygen with a portion of the carbonaceous matter and forming oxy-carbon gases, passing the resulting gases and vapors into a contact chamber wherein the alkali-metal compound is condensed, and continuing the reduction of the sulphur dioxide by means of the oxy-carbon gases under the catalytic influence of the condensed alkali-metal compound.

2. In the method of claim 1, impregnating the carbonaceous matter with an alkali-metal compound of the group consisting of sodium carbonate, sodium sulphate and sodium sulphide.

AXEL RUDOLF LINDBLAD.